Feb. 14, 1928.
C. G. HARRIS
1,659,292
RESILIENT SUPPORT FOR VEHICLES
Filed Nov. 27, 1925
2 Sheets-Sheet 2
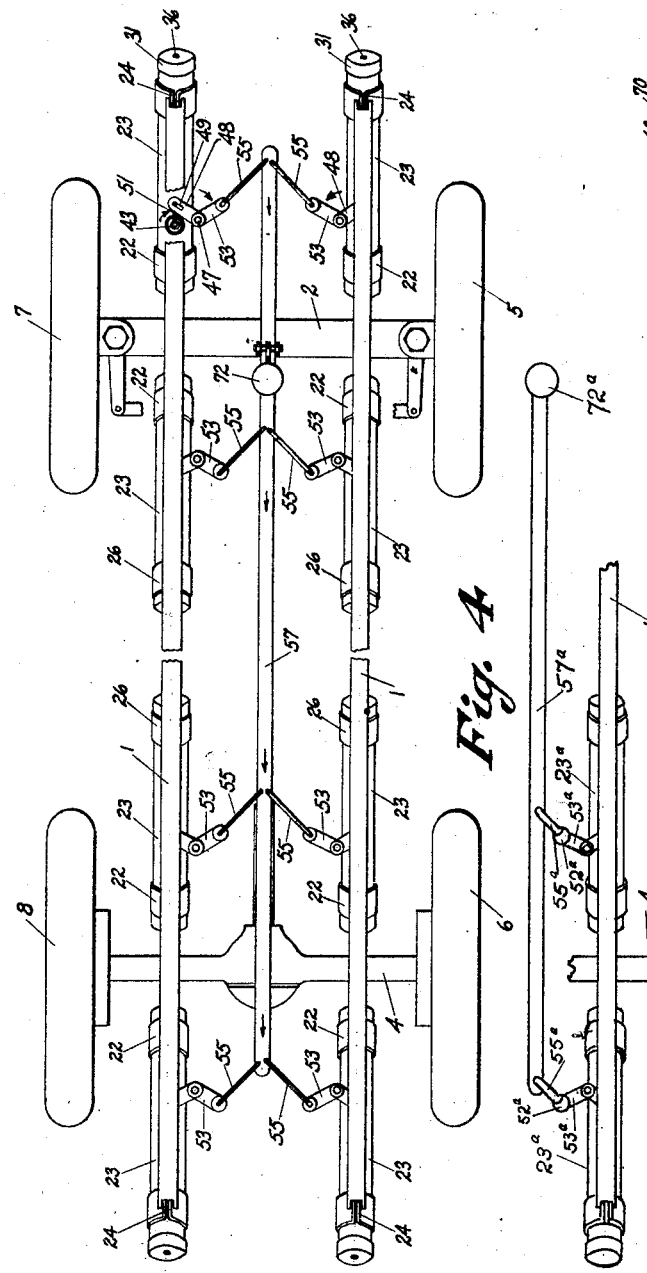
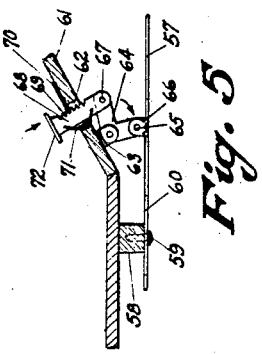
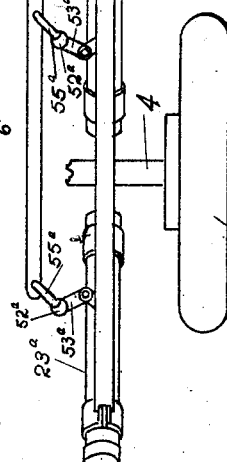
INVENTOR
CLIFFORD G. HARRIS
BY
Philip S. Hopkins
ATTORNEY Patented Feb. 14, 1928.

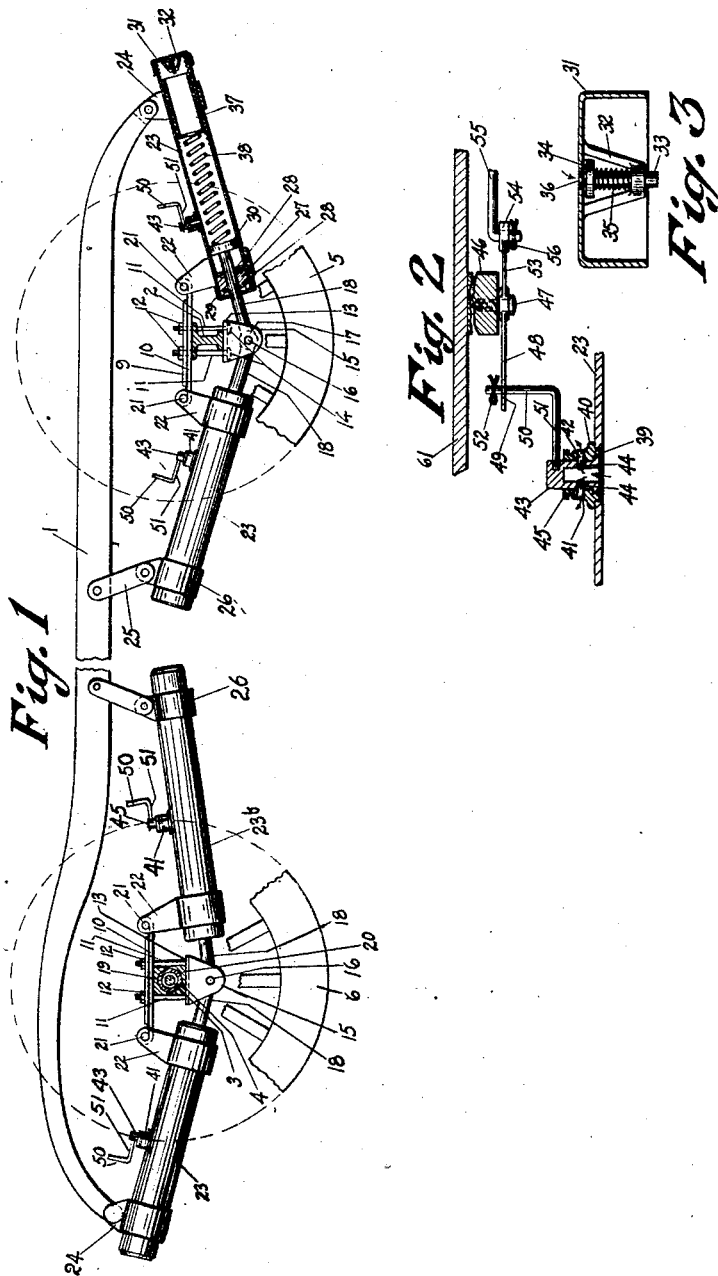

1,659,292

UNITED STATES PATENT OFFICE.

CLIFFORD G. HARRIS, OF BINGHAMTON, NEW YORK.

RESILIENT SUPPORT FOR VEHICLES.

Application filed November 27, 1925. Serial No. 71,667.

This invention relates to elastic or resilient devices for supporting the body of a vehicle upon its running gear, and is particularly applicable to automobiles, motor trucks, and like vehicles, although the same may be used with equal facility and advantage upon carriages, wagons and other vehicles.

The principal object of my invention is to provide a resilient body support which will effectively cushion and absorb the shocks, vibrations, jolts, and bumps transmitted to the running gear by the rough and irregular surface of the road over which the vehicle travels.

Another object is to combine in such a supporting device, the use of springs and air compression.

A further object is to provide means for regulating the air compression used in this device, and a still further object is to provide a central control for regulating such air pressure, preferably from the dash or other convenient point in the body of the vehicle.

A still further object lies in the provision of cylinders or tubes within which operate pistons or plungers against the tension of springs and against air compression within the cylinders, such cylinders and plungers being suitably hung and attached to the frame or chassis of the car at one end, and at the other end connected with the axles of the car.

A further important object is to provide means whereby the pistons upon reaching a predetermined point of travel within the cylinders will automatically cut off the air escape from the cylinders, thereby forming a solid air cushion within the cylinders, against which the pistons strike when a severe shock or obstruction causes the axles of the car to rise above an abnormal point. The advantage of such a construction lies in the tendency of the axle, and consequently the wheels, to be immediately forced downwardly again to the normal position.

Still another object is to provide a construction for connecting the suspension device with the axles of the car, whereby a leverage action is produced as between said axle and the pistons or plungers operating within the cylinders.

Another object includes the provision of a light, effective, easily assembled, and inexpensive suspension device which lends itself to application on practically any type of vehicle, and which adds immeasurably to the riding qualities of the vehicle.

Other objects and advantages in details of construction and operation will be apparent as the description proceeds, reference being had to the accompanying drawings wherein I have illustrated one practical embodiment of my invention, and in which like reference numerals indicate like parts.

In the drawing:

Figure 1 is a side view of a vehicle chassis, certain parts being broken away for clearness in illustration, and certain parts being shown in cross section, illustrating the assembly of my improved suspension device on a vehicle.

Figure 2 is a detail, partly in section, illustrating the air valve mounted upon one of the cylinders, and the actuating means therefor.

Figure 3 is a detail of the intake valve mounted in the outer end of the cylinders.

Figure 4 is a top plan view of the running gears of a vehicle and illustrating clearly the method of my centralized control for the regulation of the valves.

Figure 5 is a detail of the means for operating such control.

Figure 6 is a detail illustrating the application of the controlling means to a single set of cylinders.

In Figure 1, the reference character 1 refers to one side of the vehicle chassis, or supporting frame, upon which the body of the vehicle is usually mounted. A front axle 2, and a rear axle 3, the latter enclosed by the housing 4, are mounted adjacent each end of the frame 1, and support the wheels 5, 6, 7 and 8, of the vehicle in the usual manner. Across the top of the front axle 2 and near each end thereof, are mounted flat straps of iron, steel or other suitable rigid material, and indicated at 9 and 10. These straps are secured to the axle rigidly by bolts 11, extending downwardly through the flanges of the axle and secured thereon by nuts 12. The lower ends of the bolts 11 extending below the axle pass through a plate 13, and with the heads 14 of the bolts lying on the under side of the plate, whereby when the nuts 12 are tightened, said plate will be drawn tightly and rigidly against the axle 2.

Each end of the plate 13 is turned downwardly to form ears 15. These ears provide a bearing for the pintle 16, upon which are rotatably secured the ends 17 of the plungers or piston rods 18.

A similar construction is found upon the rear axle housing 4, modified only by the use of saddle blocks 19 and 20 conforming to the shape of the particular axle housing, and supporting the straps 9 and 10 and the plate 13.

Pivoted as at 21, to the outer ends of the straps 9 and 10, are brackets 22, having their outer ends rigidly secured to and supporting the inner ends of tubes or cylinders 23.

Pivoted to the extreme ends of the frame 1 are depending brackets 24, having their lower ends rigidly secured to and supporting the outer ends of the adjacent cylinders 23. Pivotally secured to the sides of the frame 1, between the axles 2 and 3, are links 25, pivoted to the lower ends of which are brackets 26, having their lower ends secured to and supporting the outer ends of the adjacent cylinders 23.

The inner end of each cylinder 23, that is, the end next adjacent the axle, is provided with a plug 27, provided with an opening through which the piston rod 18 may pass. Bushings 28 at either end of the opening may be provided to prevent the leakage of air through the opening. A cap 29 is suitably secured over the inner end of the cylinders.

The inner ends of the piston rods 18 are provided with plungers or heads 30, which may be suitably formed so as to slide within the cylinders, without permitting leakage of air past the head. This type of piston or plunger is familiar in many arts, being commonly used in connection with air pumps.

The outer ends of the cylinders 23 are provided with caps 31 which may be suitably secured in position, and each of which carries on its inner side a bracket 32 supporting the stem 33 of a valve 34, normally urged by spring 35 to close an opening or port 36 in the end of the cap through which the air may be drawn upon the inward stroke of the piston head 30.

Adjacent the outer end of each cylinder, and suitably secured therein, as by screw threading to provide adjustments, is a hollow plug 37. A coil spring 38 lies within each cylinder 23, being under tension between the piston head 30 and the inner end of the plug 37.

An opening 39 is provided in the top of each cylinder 23 at a suitably predetermined point, and inserted in such opening is a screw threaded plug 40, the inner end of which is flush with the inner surface of the cylinder 22. The plug 40 is hollow, longitudinally, and is provided on either side with ports 41 and 42. Rotatable within the plug 40 is a valve 43, provided with ports 44, which may register with ports 41 and 42. A cap 45 secures the valve 43 against longitudinal movement.

It is sometimes necessary, due to the particular vehicle construction to which my suspension device is applied, to lengthen one or more of the cylinders and plungers in order to equalize the compression within the cylinders. This may be caused by varying distances between the axle and the supporting end of the chassis or frame, etc. This construction is illustrated in Figure 1 wherein the inner cylinder 23ᵇ is longer than the others. In such event, it will also be observed that the valve is mounted in a position proportionate with the increased length of the cylinder and piston.

Depending from the under side of the body of the car at points adjacent each cylinder 23, are blocks 46 rigid with said body. In each of said blocks 46, a pin 47 provides a pintle for a bell crank lever, one end 48 of which is slotted at 49 for engagement with the vertical section 50 of a valve operating crank having its horizontal section 51 secured to the valve 43, whereby the latter may be rotated to open or close the ports 42 and 44. Suitable means, such as a cotter pin 52, is provided in the end of the vertical section 50 of the valve crank, whereby disengagement of this member with the bell crank 48 is prevented. The slot 49 in the end of the bell crank 48 permits relative sliding movement between the member 50 and member 48, occasioned by the rise and fall of the cylinders. This method and means of connecting the valves with their operating devices is merely illustrative, and I do not limit myself to such construction. Obviously many other types of connecting means, such as ball and socket joints, etc., may be employed with equal facility, as illustrated in Figure 6.

The opposite end 53 of the pivoted bell crank lever is pivotally engaged as at 54 by one end of a link 55 secured against disengagement by suitable means such as the cotter pin 56. The link 55 extends inwardly towards the center of the car at an angle and has its inner end secured to an adjusting rod 57 extending longitudinally of the car for substantially the length thereof.

This adjusting rod 57 is slidably mounted for longitudinal movement and as shown in Figure 5, it may be supported beneath the body of the car as by means of blocks 58 provided with headed pins 59 engaging within the slots 50 in the adjusting bar 57.

Figure 4 illustrates the manner in which each of the valves of the cylinders is connected to the adjusting bar 57, whereby longitudinal movement of the said bar will result in adjusting the ports of the valves in the cylinders. Means are provided for conveniently adjusting the bar 57, such means being illustrated in Figure 5. 61 indicates the floor board of the car provided with a slot or opening 62. Depending from the under side of the floor board 61, adjacent the opening 62, is a bracket 63 providing a pivot for the bell crank 64. The lower end of the bell crank 64 is pivoted at 65 to ears 66, struck up from the sides of the adjusting rod 57. The opposite end of the bell crank 64 is pivotally connected at 67 with the lower end of a plunger 68 provided along one side with teeth 69 for engagement with one edge of a plate 70 slightly overhanging the opening 62. A spring 71 normally forces the member 68 into engagement with this plate 70. A head 72 is provided on the upper end of the member 68 whereby the operator may easily, by foot pressure, adjust the position of the member 68 and consequently the position of adjusting rod 57.

The foregoing description illustrates the manner of adjusting all of the valves simultaneously. It sometimes occurs that due to an extra weight on one side of the car only, or on one end or one corner, it is desirable to adjust merely one or more of the sets of valves. To this end, I have illustrated in Figure 6, a modification wherein a single set of cylinders 23$^a$ is provided with an independent adjusting bar 57$^a$, connected by links 55$^a$, and bell cranks 53$^a$ with the valves of the cylinders. If desired a ball and socket connection between the links and valves may be used, as at 52$^a$. The foot pedal 72$^a$ operates the adjusting bar in the same manner as heretofore described. It will be understood that if desired, an independent adjusting means of this character may be provided for each of the sets of cylinders whereby the operator may selectively adjust any set or sets independently of the others. In such event, it will of course be understood that there will be a foot pedal operating device for each adjusting means, located preferably near the operator. This has not been illustrated inasmuch as it is merely duplication of the parts already shown.

The operation of my invention is as follows: Assuming the parts to be assembled and adjusted in accordance with Figure 1 of the drawing and the car empty or unloaded, when a load is now placed on the car by the weight of the driver, passengers, or in other ways, the frame 1 of the car will of course assume a lower position with respect to the axle bearings 2 and 3 which will result in lowering the outer ends of the cylinders 23 in accordance with the movement of the frame 1 and thereby causing the pistons 30 to project slightly inwardly within the cylinders against the tension of the springs 38. The air pressure within the cylinders adjusts itself to the load through the valve 43. The operator may regulate this adjustment by opening or closing the valves to a greater or less degree depending upon the weight of the load carried in the car. If desired, he can close the valves completely, although unless the load is extremely great, it will be advisable to leave the valves open a trifle to permit the air to escape through them so long as the piston 30 does not project past the valve opening in the cylinders and thus automatically close them. For ordinary purposes and over the average type of road, the piston 30 will play between the valves and the plugs 27. It will be understood that as the piston moves back and forth due to the up and down motion of the axle caused by irregularities in the road, this piston 30 will be riding against the combined air compression and the tension of the springs 38. The amount of the air compression is as before stated regulated by the amount of leakage which is permitted through the valve 43. It will be understood also that upon the backward movement of piston 30, the valve 34 in the end of the cylinders may open and suck in air to replace that which has been forced out through the valves 43. The tension of the spring 38 is adjustable in the manner hereinbefore described through the medium of plugs 37.

A very positive action of the plungers 18 and pistons 30 within the cylinders is provided both because of the connection with the axle of the ends of the plungers 18, and the cylinders 23 through the medium of brackets 22 and plates 9 and 10. As will be noted from Figure 1, a leverage action takes place upon the rising of axle 1, due to an obstruction in the road, in which case the straps 9 and 10 compel an upward movement of the inner ends of the cylinder 23 by means of brackets 22, thereby keeping the cylinders 23 in alignment with the piston 30, which are positively forced into the cylinders during such movement because of the connection between the plungers 18 and the axle 2. From this, it will be understood that the force of the shock taken by the wheels and axle of the car is absorbed by the plunger cylinder action, the pistons 30 working against combined air compression and spring tension.

If an unusual obstruction is encountered, whereby to lift the axle 2 to an abnormally high point, the pistons 30 will be forced far enough within the cylinders 23 to cover the valve 43 completely, thereby cutting off any escape of air from the cylinders 23. At this point, it will be understood that piston 30 encounters a solid air cushion which combined with the spring 38 has a tendency to force the pistons 30 back to their normal position as promptly as the obstruction in the road will permit, thereby cushioning any shock which might result from the downward movement of the axle. In other words, this arrangement tends to normally force the wheels and axles to their normal position in engagement with the road.

An important and advantageous feature of this invention lies in the fact that the operator may from his seat within the car, by a simple operation, adjust the position of the valves in the cylinders mounted on the car.

It will be understood by those skilled in the art, that my invention is susceptible to various changes in details of construction and operation, without departing from the scope of the invention. I do not limit myself therefore to the exact construction shown and described other than by the appended claims.

I claim:—

1. A resilient support for vehicles comprising in combination a body support member and an axle, cylinders having a pivoted connection at their outer ends to said member, and pivotally supported at their inner ends by said axle, plungers also pivoted at one end to said axle and working within said cylinders against springs, and air means in said cylinders for stopping said plungers at a predetermined point of their inward movement whereby said axle is normally forced to its normal position.

2. A resilient support for vehicles comprising in combination, a body supporting member and axles, cylinders pivoted at their outer ends to said member on opposite sides of said axles and having pivotal connection at their inner ends with said axles, springs within said cylinders, plungers in said cylinders acting against said springs, said plungers having pivotal connection with said axles, and air vents in said cylinders in the path of movement of said plungers.

3. A resilient support for vehicles comprising in combination a body support member and an axle, cylinders having a pivoted connection at their outer ends to said member on either side of said axle and pivotally supported at their inner ends by said axle, plungers also pivoted at one end to said axle, the opposite ends of said plungers operating within said cylinders against compression.

4. A resilient support for vehicles comprising in combination a body support member and an axle, cylinders having a pivoted connection at their outer ends to said member on either side of said axle and pivotally supported at their inner ends by said axle, plungers also pivoted at one end to said axle, the opposite ends of said plungers operating within said cylinders against combined spring and air compression.

5. A resilient support for vehicles comprising in combination a body supporting member and an axle, means rigidly secured to said axle pivotally supporting one end of a pair of cylinders, said cylinders pivotally supported at their other ends by said members, and plungers pivoted at one end to said axle working within said cylinders against compression.

6. A resilient support for vehicles comprising in combination a body supporting member and an axle, supporting means on said axle comprising lateral strips overhanging the top thereof and rigidly secured thereto, a rigid depending bracket below said axle providing a bearing, cylinders pivotally supported at their outer ends by said member and at their inner ends by said strips, and plungers working within said cylinders against compression and pivoted at one end to said bearing.

7. A resilient support for vehicles comprising in combination a body supporting member and an axle, cylinders having pivotal connection at one end with said member, and at the opposite ends with said axle, air tight plungers working within said cylinders with their projecting ends pivotally connected with said axle, an adjustable valve in said cylinder having a port communicating therewith, said port lying within the path of said plunger and adapted to be closed thereby at a predetermined point.

8. A resilient support for vehicles comprising in combination a body supporting member and an axle, cylinders having pivotal connections at opposite ends with said member and said axle, air tight plungers working within said cylinders and having pivotal connections with said axle, an adjustable valve in each of said cylinders for releasing the air therefrom in front of said plungers, and remote means for adjusting said valve.

9. A resilient support for vehicles comprising in combination a body supporting member and axles, cylinders having pivotal connections at opposite ends with said member and with adjacent axles, air tight plungers working within said cylinders and having pivotal connections with adjacent axles, an adjustable valve in each of said cylinders for releasing the air therefrom in front of said plungers, and a single control for adjusting said valves simultaneously.

10. A resilient support for vehicles comprising in combination a body supporting member and axles, cylinders having pivotal connections at opposite ends with said member and the adjacent axles, air tight plungers working within said cylinders and having pivotal connections with said axles, an adjustable valve on each cylinder for releasing air therefrom in front of said plungers, adjusting means on each valve, and a single controlling bar engaging all of said means for simultaneously adjusting said valves.

11. A resilient support for vehicles comprising in combination a body supporting member and axles, cylinders having pivotal connections at opposite ends with said member and the adjacent axles, air tight plungers working within said cylinders and having pivotal connections with said axles, an adjustable valve on each cylinder for releasing air therefrom in front of said plungers, adjusting means on each valve, and a single controlling bar engaging all of said means for simultaneously adjusting said valves, and means in the body of the vehicle for operating said controlling bar.

12. A resilient support for vehicles comprising in combination a body supporting member and axles, cylinders having pivotal connections at opposite ends with said member and the adjacent axles, air tight plungers working within said cylinders and having pivotal connections with said axles, an adjustable valve on each cylinder for releasing air therefrom in front of said plungers, adjusting means on each valve, and a single controlling bar engaging all of said means for simultaneously adjusting said valves, and means in the body of the vehicle for operating said controlling bar, said means comprising a spring controlled means engaging said bar.

13. A resilient support for vehicles comprising in combination a body supporting member and axles, sets of cylinders having pivotal connections at opposite ends with said member and the adjacent axle, air tight plungers working within said cylinders and having pivotal connections with said axles, an adjustable valve on each cylinder for releasing air therefrom in front of said plungers, adjusting means on each valve, and a controlling means for each set of cylinders for adjusting the valves thereon.

14. A resilient support for vehicles comprising in combination a body supporting member and axles, sets of cylinders having pivotal connections at opposite ends with said member and the adjacent axle, air tight plungers working within said cylinders and having pivotal connections with said axles, an adjustable valve on each cylinder for releasing air therefrom in front of said plungers, adjusting means on each valve, and a controlling means for each set of cylinders for adjusting the valves thereon, and means for operating said controlling means, remote from said valves.

CLIFFORD G. HARRIS.